United States Patent
Chen et al.

(10) Patent No.: US 12,386,847 B2
(45) Date of Patent: Aug. 12, 2025

(54) METHOD, APPARATUS, ELECTRONIC DEVICE AND MEDIUM FOR EVENT EXTRACTION

(71) Applicant: Beijing Youzhuju Network Technology Co., Ltd., Beijing (CN)

(72) Inventors: Jiaze Chen, Beijing (CN); Guanhua Huang, Beijing (CN)

(73) Assignee: Beijing Youzhuju Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/415,327

(22) Filed: Jan. 17, 2024

(65) Prior Publication Data

US 2024/0265027 A1    Aug. 8, 2024

(30) Foreign Application Priority Data

Feb. 2, 2023 (CN) .......................... 202310120872.0

(51) Int. Cl.
  *G06F 16/00* (2019.01)
  *G06F 16/25* (2019.01)

(52) U.S. Cl.
  CPC ................................ *G06F 16/254* (2019.01)

(58) Field of Classification Search
  CPC ...... G06F 40/289; G06F 40/30; G06F 16/254; G06F 16/353; G06F 16/383; G06F 40/166; G06F 40/211; G06F 40/253; G06F 16/951; G06F 16/243; G06F 40/58; G06F 40/40; G06F 40/51; G06F 40/35; G06F 16/35; G06F 40/44; G06F 40/205; G06F 40/284; G06F 40/47; G06F 40/247; G06F 40/42; G06F 40/45; G06F 16/31; G06F 16/13; G06F 16/24; G06F 16/258; G06F 16/27; G06F 16/28; G06F 16/36; G06F 16/81; G06F 16/38; G06F 16/93; G06F 40/10; G06N 20/00; G06N 3/0442; G06N 3/045; G06N 3/0455; G06N 3/0475; G06N 3/08; G06N 3/096
  See application file for complete search history.

(56) References Cited

U.S. PATENT DOCUMENTS

2016/0041986 A1 *   2/2016   Nguyen ................. G06Q 50/01
                                                       707/711
2021/0133216 A1 *   5/2021   Meyerzon ......... G06F 16/24573

* cited by examiner

*Primary Examiner* — Shyue Jiunn Hwa
(74) *Attorney, Agent, or Firm* — Alleman Hall & Tuttle LLP

(57) ABSTRACT

Embodiments of the present disclosure relate to a method, an apparatus, an electronic device and a medium for event extraction. The method comprises: extracting a plurality of named entities from a document as a plurality of event arguments. The method further includes determining an event type and a template corresponding to the event type in the document. The method also includes filling the plurality of event arguments in respective locations in the template to generate a plurality of candidate event records, and filtering the plurality of candidate event records to obtain one or more target event record. In this way, respective candidate event records are generated through iteration while event extraction is performed at a document level, which can avoid performance fluctuations caused by manual selection of an event role generation sequence, and can also avoid underfitting brought about by parallel generation to thus improve the event extraction accuracy.

20 Claims, 9 Drawing Sheets

300

310

| EquityOverweight | |
|---|---|
| EquityHolder | Jinggong Group |
| TradedShares | 182,038 shares |
| StartDate | Dec 15, 2011 |
| EndDate | Dec 15, 2011 |
| LaterHoldingShares | 91,062,058 shares |
| AveragePrice | NULL |

302 — Event type

320

| EquityUnderweight | |
|---|---|
| EquityHolder | Jinggong Group |
| TradedShares | 35,000 shares |
| StartDate | Dec 16, 2011 |
| EndDate | Dec 16, 2011 |
| LaterHoldingShares | 91,027,058 shares |
| AveragePrice | 19.88 |

304 — Event argument

306 — Event role

Fig. 3

| Event type | Template |
| --- | --- |
| EquityFreeze | On UnfrozeDate, LegalInstitution freezes or unfreezes the FrozeShares held by EquityHolder. It starts from StartDate and ends at EndDate. At present, he/she/it still holds TotalHoldingShares shares of the company, accounting for TotalHoldingRatio of the company's total share capital. |
| EquityRepurchase | CompanyName repurchases RepurchasedShares at the highest price of HighestTradingPrice per share and the lowest price of LowestTradingPrice per share, the repurchase time is ClosingDate, and the total payment amount was about RepurchaseAmount. |
| EquityUnderweight | EquityHolder sells TradedShares of the company at the average price of AveragePrice per share. The sale starts from StartDate and ends at EndDate. After the sale, he/she/it still holds LaterHoldingShares shares of the company. |
| EquityOverweight | EquityHolder buys TradedShares of the company at the average price of AveragePrice per share. The purchase starts from StartDate and ends at EndDate. After the purchase, he/she/it still holds LaterHoldingShares shares of the company. |
| EquityPledge | On ReleasedDate, Pledger pledges or releases PledgedShares to Pledgee. It starts from StartDate and ends at EndDate. At present, he/she/it still holds TotalHoldingShares of the company, accounting for TotalHoldingRatio of the company's total share capital, and accumulatively pledges TotalPledgedShares shares. |

Fig. 7

METHOD, APPARATUS, ELECTRONIC DEVICE AND MEDIUM FOR EVENT EXTRACTION

CROSS REFERENCE TO RELATED APPLICATIONS

This application claims priority to CN Application No. 202310120872.0, filed Feb. 2, 2023, and titled "METHOD, APPARATUS, ELECTRONIC DEVICE AND MEDIUM FOR EVENT EXTRACTION", the disclosure of which is incorporated herein by reference in its entirety.

FIELD

Embodiments of the present disclosure generally relate to the field of computers, and more specifically, to a method, an apparatus, an electronic device and, a medium for event extraction.

BACKGROUND

The event extraction technique is to extract an event of user's interest from unstructured information and present it to the user in a form of structured event records. Event extraction has wide applications in fields of text summarization, automatic question-answer generation, automatic construction of event graphs, and the like. Automation of event extraction tasks can enable computing devices to automatically detect events and event contents included in a document, and form structured data for subsequent processing.

SUMMARY

Embodiments of the present disclosure provide a method, an apparatus, an electronic device, and a computer readable storage medium for event extraction.

In a first aspect of embodiments of the present disclosure, there is provided a method for event extraction. The method includes extracting a plurality of named entities from a document as a plurality of event arguments, where the document comprises at least two sentences. The method further includes determining an event type and a template corresponding to the event type in the document. Moreover, the method includes filling the plurality of event arguments in respective locations in the template to generate a plurality of candidate event records, where, during generation of the plurality of candidate event records, each candidate event record starting from a second candidate event record in the plurality of candidate events is generated based on a candidate event record generated previously. The method also includes filtering the plurality of candidate event records to obtain one or more target event record.

In a second aspect of embodiments of the present disclosure, there is provided an apparatus for event extraction. The apparatus includes a named entity extraction module configured to extract a plurality of named entities from a document as a plurality of event arguments, where the document comprises at least two sentences. In addition, the apparatus includes an event type determining module configured to determine an event type and a template corresponding to the event type in the document. The apparatus also includes an event record generation module configured to fill the plurality of event arguments in respective locations in the template to generate a plurality of candidate event records, where, during generation of the plurality of candidate event records, each candidate event record starting from a second candidate event record in the plurality of candidate events is generated based on a candidate event record generated previously. The apparatus further includes an event record filtering module configured to filter the plurality of candidate event records to obtain one or more target event record.

In a third aspect of embodiments of the present disclosure, there is provided an electronic device. The electronic device includes a processor, and a memory coupled to the processor and having instructions stored therein, where the instructions, when executed by the processor, cause the electronic device to perform the method of the first aspect.

In a fourth aspect of embodiments of the present disclosure, there is provided a computer readable storage medium having one or more computer executable instructions stored thereon, where the one or more computer executable instructions, when executed by a processor, implement the method of the first aspect.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The above and other objectives, features, and advantages of respective embodiments of the present disclosure will become more apparent, through the following detailed description with reference to the accompanying drawings. Throughout the drawings, the same or similar reference symbols refer to the same or similar components, where:

FIG. 3 is a schematic diagram of an event type, an event argument, and an event role according to some embodiments of the present disclosure;

FIG. 7 is a schematic diagram of a template of an event according to some embodiments of the present disclosure;

Throughout the drawings, the same or similar reference symbols refer to the same or similar components.

DETAILED DESCRIPTION OF EMBODIMENTS

Figure 1:
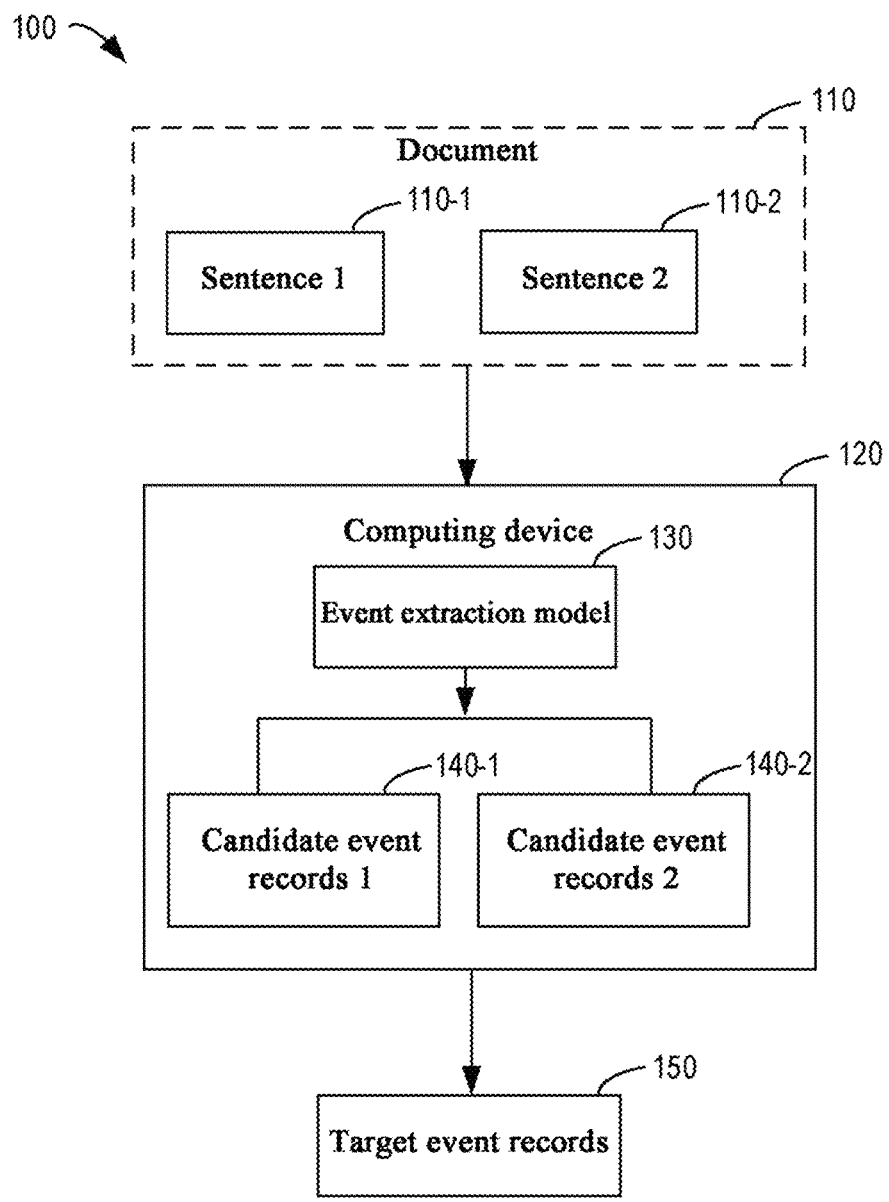
FIG. 1 is a schematic diagram of an example environment where a method for event extraction according to some embodiments of the present disclosure can be implemented.

It would be appreciated that data involved in the present technical solution (including, but are not limited to, data per se, acquisition or use of data) should comply to the corresponding and related provisions of the laws and regulations.

Reference now will be made to the drawings to describe embodiments of the present disclosure in detail. Although some embodiments of the present disclosure are depicted in the drawings, it would be appreciated that the present disclosure could be implemented in various forms, and should not be construed as being restricted to those illustrated here. Rather, those embodiments are provided to enable those skilled in the art to understand the present disclosure more thoroughly and completely. It is to be understood that the drawings and embodiments are provided only as examples, without suggesting any limitation to the protection scope of the present disclosure.

In the following description about the embodiments, the term "includes" and similar expressions are to be read as open terms that mean "includes, but is not limited to." The term "based on" is to be read as "based at least in part on." The term "an embodiment" or "the embodiment" is to be read as "at least one embodiment." The terms "first," "second," and the like may refer to different objects or the same object unless indicated otherwise. Other definitions, implicit or explicit, may be included below.

In some embodiments of the present disclosure, an event extraction task in English is taken as an example for description. However, an event extraction task in other language (e.g. Chinese) may also be used in conjunction with embodiments of the present disclosure. In addition, all the specific numerical values used here are provided only as examples to help understanding, without any intention to limit the scope.

In an event extraction task, it is required to perform event detection while correctly determining an event type thereof. The event extraction task also requires argument detection, including detecting related elements of the event, and simultaneously correctly determining respective roles of those elements in the event.

In a legacy event extraction method, the trigger word-free event extraction method includes generating event arguments autoregressively in a pre-given sequence by constructing an entity-based directed acyclic graph (EDAG). In a further legacy event extraction method, all arguments in an event record are simultaneously generated through a parallel method.

Most of the legacy trigger word-free event extraction methods include generating event arguments autoregressively in a pre-given sequence by constructing an entity-based directed acyclic graph, or generating simultaneously all arguments in an event record through a parallel method. Since event arguments in an event record are typically dispersed in a plurality of sentences while overlapping arguments contained in a plurality of event records are repeated more frequently, this leads to low-quality labeling of trigger words and a need for a trigger word-free method. Accordingly, it is a main challenge of a trigger word-free event extraction method to extract a plurality of event records in absence of trigger words.

Nevertheless, research shows that it is required in the entity-based directed acyclic graph method to predetermine an event role generation sequence, different event role generation sequences cause significant fluctuations in performance of the event extraction model, and the parallel method avoids selection of an event role sequence. However, the parallel method has a serious under-fitting problem, and even results in a low accuracy of extracting multiple event roles in some scenarios.

In order to solve those problems, embodiments of the present disclosure provide a solution of document-level event extraction (DEE) to extract a plurality of event records from an entire document. The solution provides an iteratively parallel generation method with the pre-filling strategy (IPGPF). The method of the present disclosure can enable iterative parallel generation of event roles, to avoid influence on the event role generation sequence. since there is no need for generating event arguments in a pre-given sequence, the method omits manual giving of an event argument sequence that is dependent only on experience, thus avoiding performance fluctuations caused by manually selection of the event role generation sequence. Therefore, even though event arguments of an event record are dispersed in a plurality of sentences, an event record can be accurately extracted without manually giving a sequence in advance. In some embodiments, in order to mitigate the under-fitting problem during parallel generation, the present disclosure further proposes a pre-filling strategy which includes, during event record generation, selecting some results from historical generated results as event role fillers, and then generating unfilled event roles based on filled event roles. Such pre-filling strategy can avoid under-fitting caused by the conventional parallel methods, to thus improve the event extraction accuracy.

Hereinafter, an event extraction process of an English document will be discussed in some embodiments. It would be appreciated that this is provided only to enable the ordinary skill in the art to better understand the principle and idea of the embodiments of the present disclosure, without the intention of limiting the scope of the present disclosure in any manner.

FIG. 1 illustrates a schematic diagram of an example environment 100 where a method for event extraction according to some embodiments of the present disclosure can be implemented. As shown therein, the example environment 100 may include a document 110. The document 110 may be comprised of at least two sentences, for example, a sentence 1 (i.e., 110-1) and a sentence 2 (i.e., 110-2). It would be appreciated that the document 110 may include more sentences (not shown).

In the environment 100, a computing device 120 may be further included. The computing device 120 may be a computer, a computing system, a single server, a distributed server, or a cloud-based server. The computing device 120 can acquire the document 110.

The computing device 120 is configured therein with an event extraction model 130. After acquiring the document 110, the event extraction model 130 can generate a plurality of candidate event records, for example, a candidate event record 140-1 and a candidate event record 140-2. It would be appreciated that the number of candidate event records could be varied with different needs, and the candidate event records therefore may be provided in plural.

After generating a plurality of candidate event records, the event extraction model 130 filters the candidate event records, to obtain target event records 150. It would be appreciated that a number of target event records may be varied with the configuration or the content of the document, which is therefore not limited to a target event record. The number of target event records is generally less than the number of candidate event records.

It is to be understood that the architecture and functionality in the example environment 100 are described for the exemplary purpose, without implying any limitation to the scope of the present disclosure. The embodiments of the present disclosure can be applied to other environment having a different structure and/or functionality.

Reference will be made to FIGS. 2-8 to describe below in detail the process according to embodiments of the present disclosure. For ease of understanding, the specific data mentioned in the following description are provided only as examples, without limiting the scope of protection of the present disclosure. It would be appreciated that the embodiments as will be described later may further include additional acts and/or omit the shown acts, in which the scope of the present disclosure is not limited.

Figure 2:
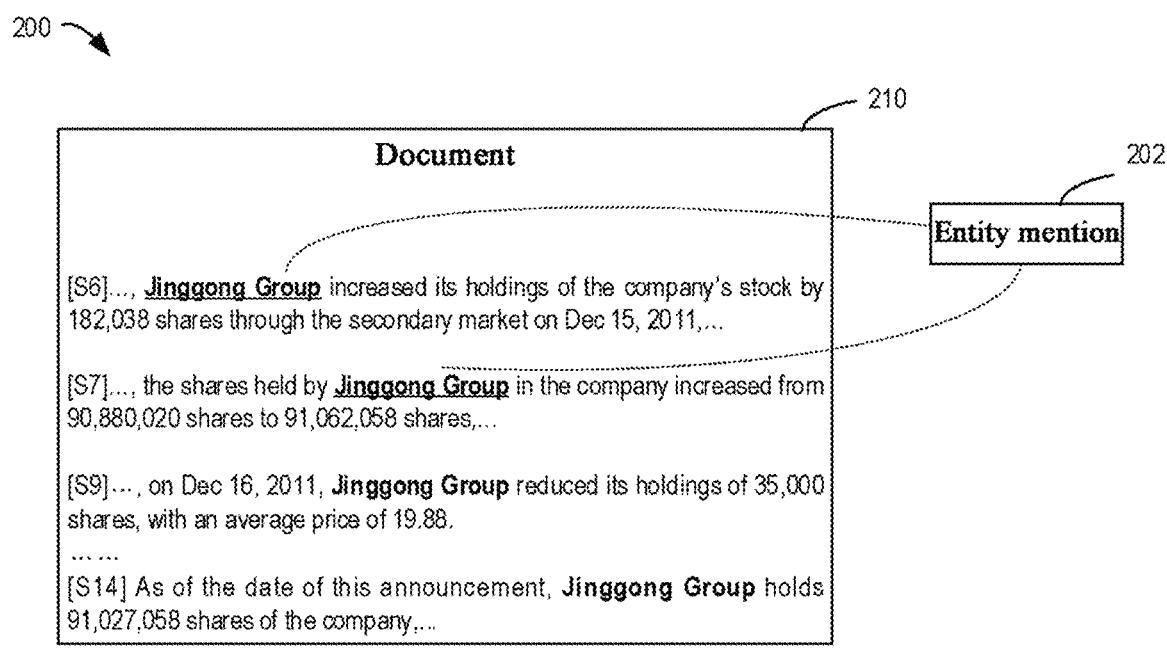
FIG. 2 is a schematic diagram of a named mention according to some embodiments of the present disclosure.

FIG. 2 illustrates a schematic diagram of an entity mention according to some embodiments of the present disclosure. In the document-level event extraction method, a named entity may be read as a noun text of a predefined semantic type (e.g. person, place, organization, or the like). The entity mention 202 may be read as a text corresponding to a named entity in the document.

By way of example, the document 210 may include a sentence S6: "Jinggong Group increased its holdings of the company's stock by 182,038 shares through the secondary market on Dec. 15, 2011." The document 210 may further include a sentence S7, a sentence S9, a sentence S14, and the like. In the sentence S6 and the sentence S7, Jinggong Group is the entity mention 202. In the sentence S9 and the sentence S14, Jinggong Group is also the entity mention 202. Other entity words may also be the entity mention 202.

FIG. 3 is a schematic diagram 300 of an event type, an event argument, and an event role according to some embodiments of the present disclosure. An event record may be read as an event expression containing a plurality of event arguments and event roles thereof, for example, an event record 310 and an event record 320. In the event record 310, EquityOverweight is an event type 302. In the event record 320, EquityUnderweigth is an event type 302.

The event record 320 is taken as an example, which includes an event argument 304 and an event role 306. The event argument 304 may be read as a named entity playing a particular event role in an event, for example, Jinggong Group. The event role 306 may be read as a type (e.g. time, place, person, or the like) of event arguments, for example, EndDate.

Figure 6:
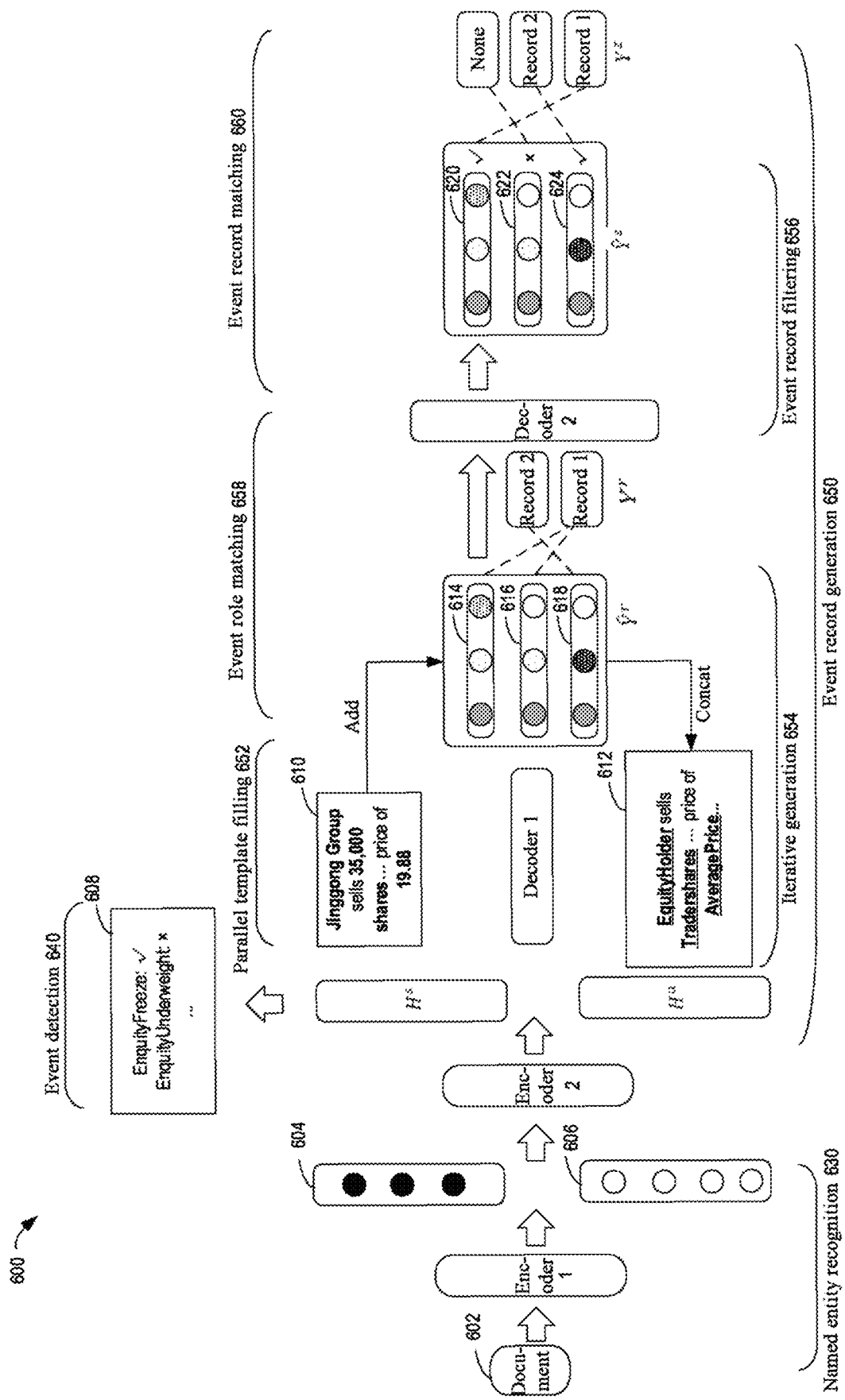
FIG. 6 is a schematic diagram of an event extraction model including a training process according to some embodiments of the present disclosure.

In the present disclosure, a trigger word-free document-level event extraction task is employed, typically including three sub-tasks: (1) named entity recognition (NER) which includes extracting named entities from a document as candidate event arguments; (2) event detection (ED) which includes determining whether a certain type of predefined events occurs in the document; and (3) event record generation (ERG) including generating event records typewise according to event types. Absence of trigger words may increase the difficulty of the document event extraction, but can omit manual selection of the event role generation sequence. Reference below will be made to FIG. 6 to describe in detail those sub-tasks.

Figure 4:
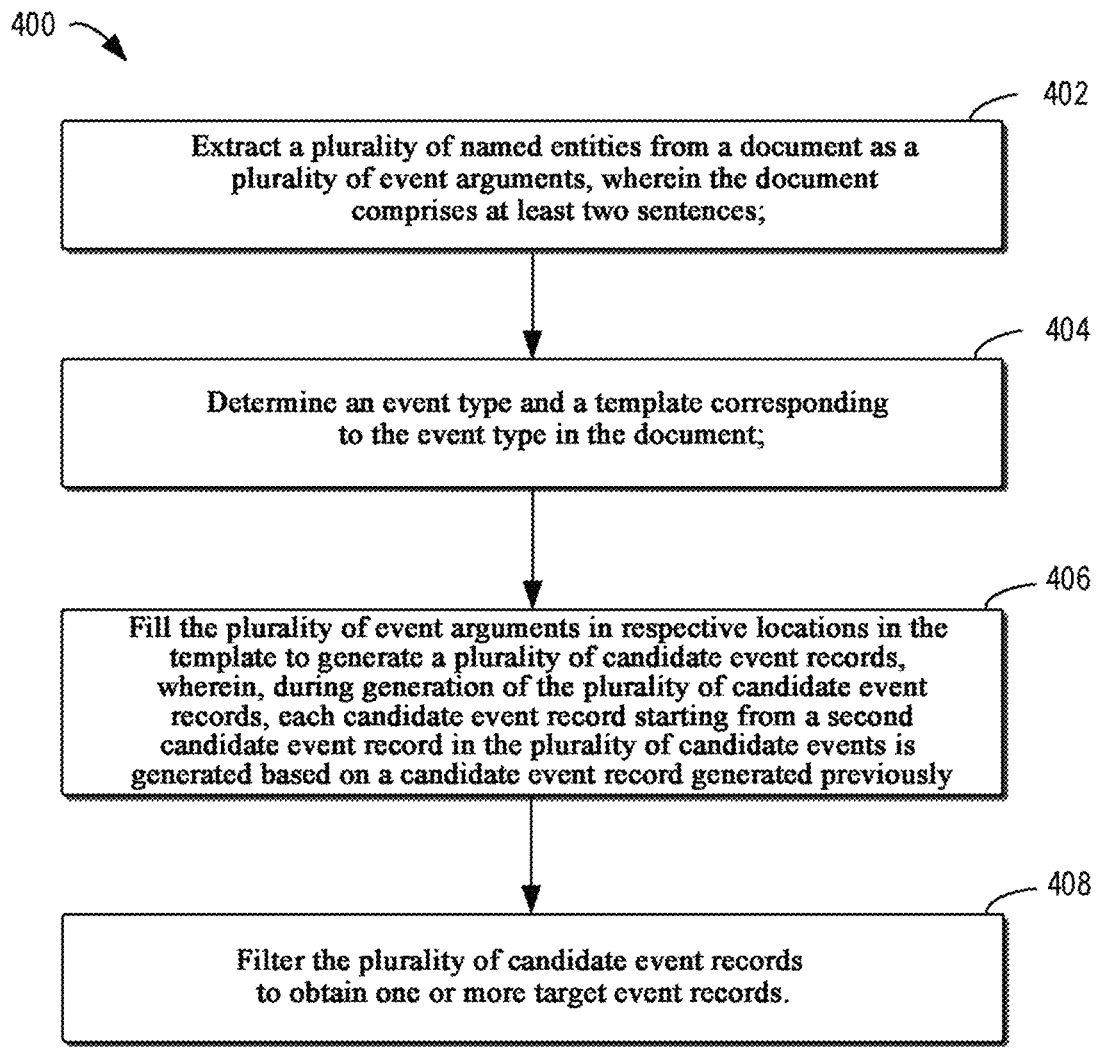
FIG. 4 is a flowchart of a method for event extraction according to some embodiments of the present disclosure.
Figure 5:
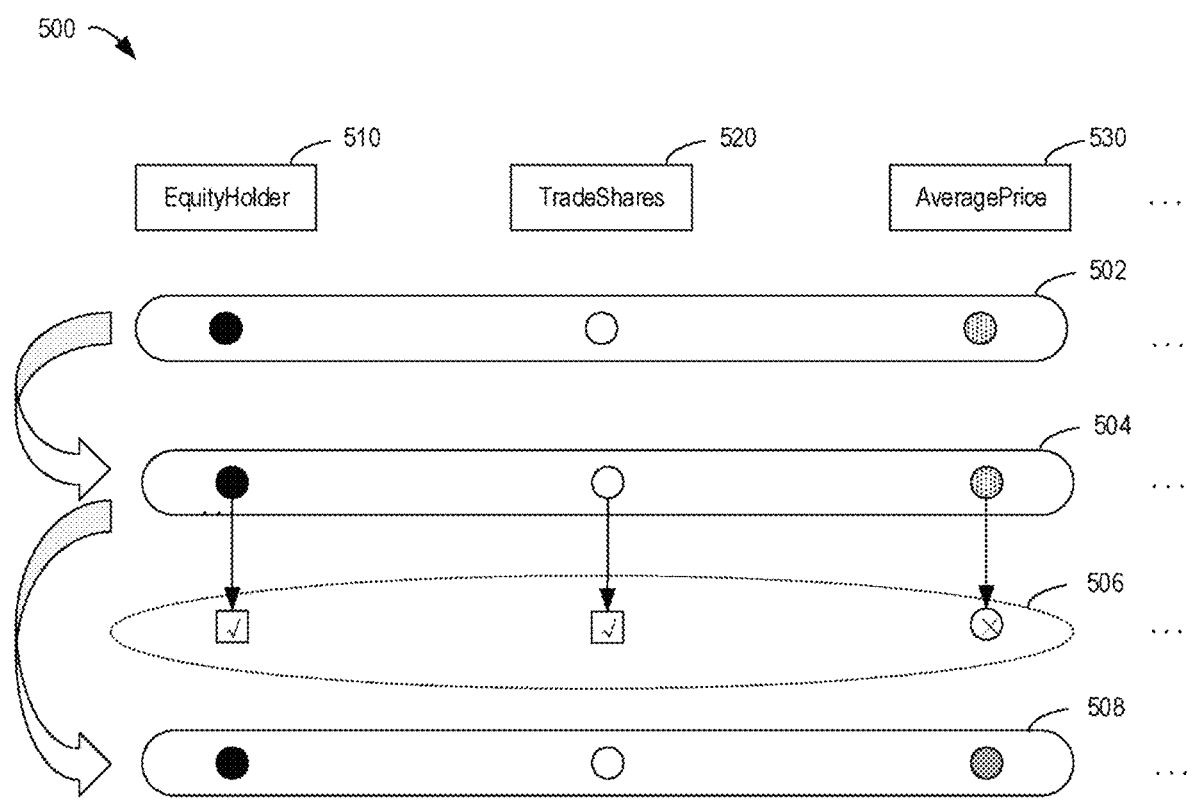
FIG. 5 is a schematic diagram of a simplified process of event extraction according to some embodiments of the present disclosure.

FIG. 4 is a flowchart of a method 400 for event extraction according to some embodiments of the present disclosure. FIG. 5 is a schematic diagram of a simplified process of event extraction according to some embodiments of the present disclosure. Hereinafter, reference will be made to FIGS. 4 and 5 to describe the event extraction task according to the present disclosure.

At block 402, a plurality of named entities are extracted from a document as a plurality of event arguments, where the document includes at least two sentences. By way of example, named entity recognition is performed for the document 110, and event roles to which recognized event roles belong include EquityHolder 510, Tradeshares 520, and AveragePrice 530.

At block 404, an event type in the document and a template corresponding to the event type are determined. By way of example, at 502, event detection is performed, where the event type is determined as EquityOverweight, and the template of the corresponding event is a template of EquityOverweight accordingly. The template of an event will be introduced in detail with reference to FIG. 7.

At block 406, a plurality of event arguments are filled in respective positons in the template, where, during generation of a plurality of candidate event records, each candidate event record starting from the second candidate record in the plurality of candidate events is generated iteratively based on a candidate event record generated previously. By way of example, at 504, the template of EquityOverweight is filled to generate a plurality of candidate event records. The first generated candidate event record is generated based on an event template. Starting from the second generated candidate event record, each candidate event record is generated based on the other generated candidate event record, in addition to the event template. At block 408, the plurality of candidate event records are filtered to obtain one or more target event records. By way of example, at 508, the plurality of candidate event records obtained at 504 are filtered, to obtain one or more target event records. For example, an argument representation and a template representation of an event record of the $t^{th}$ (where t is an integer greater than or equal to 2) round are compressed by max pooling to obtain a representation of the event record. In the $(t+1)^{th}$ round, the historical generated event record and the template to be filled this time are merged, and a $(t+1)^{th}$ event record is generated based on the event record of the $t^{th}$ round.

In some embodiments, training the event extraction model 130 may further include a pre-filling process. By way of example, at 506, a part of the historical generated candidate event records may be selected as role fillers, and then, unfilled roles are generated based on the filled roles.

With the method 400, the embodiments of the present disclosure can perform event extraction at a document level, and omit manual selection of an event role generation sequence, and can also improve the accuracy event extraction as avoiding low-quality labeling of trigger words. Without predetermining an event role generation sequence, the method 400 can reduce significant fluctuations in event extraction accuracy, and mitigate the under-fitting problem of the event extraction model.

FIG. 6 is a schematic diagram of an event extraction model 600 including a training process according to some embodiments of the present disclosure. The main idea of the process 600 is as follows: for a document D (e.g. document 602) including $N_s$ sentences $\{s_i\}_{i=1}^{N_s}$, a document-level event extraction task aims to generate a plurality of event records $Z=\{z_i\}_{i=1}^{N_z}$, where $z_i$ is an $i^{th}$ event record, and $N_z$ is a number of real event records in the document. An event record is comprised of n event arguments $z_i=(a_i^1, a_2^i, \ldots, a_i^n)$ and event roles $(r_i^1, r_i^2, \ldots, r_i^n)$ corresponding thereto.

In some embodiments, entities are extracted from a document as candidate event arguments, whether an event of a given type is included in the document is then determined, and finally, the model iteratively generates a plurality of event records and generates in parallel all roles in each event record. In some embodiments, during training of the event extraction model, a pre-filling strategy may also be used to improve the parallel generation capability of the event extraction model.

In some embodiments, in the named entity recognition 630, for the given document D including $N_s$ sentences $\{s_i\}_{i=1}^{N_s}$, a transformer encoder 1 is used to encode an entity 604 in each sentence $s=(w_1, w_2, \ldots, w_{N_w})$, and obtain an implicit representation $H^w$ 606 of the sentence:

$$H^w = Encoder1([w_1, w_2, \ldots, w_{N_w}]) \quad (1)$$

where $H^w \in \mathbb{R}^{N_w \times d}$, d is a latent space dimension, Encoder1 is an operation of the encoder 1, and $w_1, w_2, \ldots, w_{N_w}$ is words.

In some embodiments, entities are extracted using conditional random fields, and a maximum likelihood loss function of named entity recognition is obtained:

$$\mathcal{L}_{NER} = -\sum_{s \in D} \sum_{w \in s} \log P(y | w) \quad (2)$$

where y is a label of the word w, sampling is from BIO (Begin indicates a starting position of an entity, Inside is a middle word of the entity, and Other is a non-entity word) labeling standards, and P is a probability of the word w with a label y.

In some embodiments, in event detection 640, obtaining $N^e$ entities $E=\{e_i\}_{i=1}^{N_e}$, the same entities therein are compressed using max pooling. After compression, the following event argument representation of $N_a+1$ candidates is obtained:

$$\tilde{H}^a = [\tilde{h}_1^a, \tilde{h}_2^a, \ldots, \tilde{h}_{N_a}^a, \tilde{h}_{N_a+1}^a] \in \mathbb{R}^{(N_a+1) \times d} \quad (3)$$

where $\tilde{h}_{n_a+1}^a$ is an additional argument representation of Null. Moreover, after compressed using max pooling, all the word representations in the sentence serve as a representation of the sentence, to obtain the following sentence expression of the document:

$$\tilde{H}^s = [\tilde{h}_1^s, \tilde{h}_2^s, \ldots, \tilde{h}_{N_s}^s] \in \mathbb{R}^{N_s \times d} \quad (4)$$

In some embodiments, a transformer encoder 2 is used to perform feature interaction for the argument representation and the sentence representation:

$$[H^a, H^s] = Encoder2([\tilde{H}^a, \tilde{H}^s]) \quad (5)$$

where Encoder2 is an operation of the encoder 2, $H^a$ is an argument-aware event argument representation through argument perception, and $H^s$ is an argument-aware sentence representation.

In some embodiments, the encode 1 and the encode 2 may be combined for use. In some embodiments, the argument-aware sentence representation $H^s$ is used to perform a multi-type classification task to obtain a probability of presence of each type of events in the document:

$$P^c = Sigmoid(H^c) \quad (6)$$

where $W^c \in \mathbb{R}^d$ is a model trainable parameter, $P^c \in \mathbb{R}^{N_c}$ is probabilities of $N_c$ event types, and Sigmoid is an operation of the Sigmoid function.

In some embodiments, a cross-entropy loss function for computing event detection is as follows:

$$\mathcal{L}_{ED} = -\sum_{i=1}^{N_c} \mathbb{I}(y_i^c = 1) \log p_i^c + \sum_{i=1}^{N_c} \mathbb{I}(y_i^c = 0) \log(1 - p_i^c) \quad (7)$$

where $y_i^c \in \{0, 1\}$ is a real label of the $i^{th}$ event type, and $p_i^c$ is a probability of the $x^{th}$ event type.

By way of example, in block 608, the event type EquityFreeze has a higher probability and is thus determined as a detected event type; EquityUnderweight has a lower probability and is not determined as the detected event type.

During event record generation 640, based on the template of the event, an event record can be generated by filling in a given template. Hereinafter, the template of the event will be introduced with reference to FIG. 7. FIG. 7 is a schematic diagram of a template 700 of an event according to some embodiments of the present disclosure.

All roles in a parallel generation event can effectively avoid the unstable performance caused by manual selection of a role generation sequence. In order to offer a further aid in event role generation, a template can be constructed for each type of events. As shown in the above figure, event roles to be generated are represented by special characters. Based on those templates, the model can generate an event record by filling in a given template.

The template 700 includes an event type 710 and a corresponding template 720. By way of example only, the event type 710 includes: EquityFreeze, EquityRepurchase, EquityUnderweight, EquityOverweight, and EquityPledge. It would be appreciated that the template may include more event types in the financial field, or a template in other field may be used.

In some embodiments, the template corresponding to EquityFreeze is: "[o]n UnfrozeDate, LegalInstitution freezes or unfreezes the FrozeShares held by EquityHolder. It starts from StartDate and ends at EndDate. At present, he/she/it still holds TotalHoldingShares shares of the company, accounting for TotalHoldingRatio of the company's total share capital." Wherein, the underlined parts are locations to be filled with event arguments. It would be appreciated that the template may be of other form, which could be adjusted and optimized as required.

Returning now to FIG. 6, during parallel template filling 652, for a given event type, a representation of $N_t$ template words is first determined as follows:

$$Q^t = [q_1^t, q_2^t, \ldots, q_{N_t}^t] \in \mathbb{R}^{N_t \times d} \quad (8)$$

Then, a transformer decoder 1 is used to obtain an argument-aware template representation:

$$H^t = Decoder1(Q^t, H^a)$$

Next, a pointer neural network is used to filter the candidate arguments $H^a$ to obtain arguments corresponding to the event roles:

$$P^r = Softmax(\tanh(H^r W^r + H^a W^a) \cdot v) \quad (9)$$

where $H^r \in \mathbb{R}^{N_r \times d}$ is a representation of event roles in $H^t$, $W^a$, v is a model parameter, and $P^r \in \mathbb{R}^{N_r \times (N_a+1)}$ is probabilities of the event arguments corresponding to the event roles. Finally, the event arguments $\hat{H}^a$ corresponding to $N_r$ event roles can be extracted. By way of example, in block 610, Jinggong Group, 35,000 shares, and 19.88 are selected as event arguments corresponding to the event roles.

In some embodiments, during iterative generation 654, in order to make better use of the historical generated results, an iterative generation method can be used. By way of example, for a historical generated event record, the argument representation and the template representation in the event may be compressed by max pooling to obtain the representation $h^z \in \mathbb{R}^d$ of the event record. During generation of the $(i+1)^{th}$ event record, the historical generated event records and the template to be filled this time may be merged, and the $(i+1)^{th}$ event record is generated with the aid of the historical results.

In some embodiments, during event record filtering 656, all the event records in the document are extracted, where a number of iterations of event generation may be greater than a number of real event records. Therefore, a filter is required to filter out part of the event records output by the model as the final result. After the $N_i^{th}$ round of iteration, the representation $H^z = [h_1^z, h_2^z, \ldots, h_{N_i}^z] \in \mathbb{R}^{N_i \times d}$ of all the generated event records can be obtained. Then, a transformer decoder 2 and a linear classifier may be used to filter out the optimal event record as the final result:

$$\tilde{H}^z = \text{Decoder2}(H^z, H^s) \quad (10)$$

$$P^z = \text{Sigmoid}(\tilde{H}^z \cdot W^z) \quad (11)$$

where $W^z$ is trainable parameters of the event extraction model, $P^z = \mathbb{R}^{N_i}$ is scores of output event records, $\tilde{H}^z$ is a representation of filtered event records, and Decoder2 is an operation of the decoder 2.

By way of example, through the decoder 1, "Jinggong Group" matches the record 1, "35,000 shares" matches the record 1, and "19.88" matches the record 2. Those matches act as candidate event records 614, 616, and 618. In some embodiments, after the generated candidate event records are concatenated with the template 612, candidate event records can be generated iteratively. Through the decoder 2, the event record 620 (i.e., the original event record 614) matches the record 1, the event record 622 (i.e., the original event record 616) does not have a match, and the event record 624 (i.e., the original event record 618) matches the record 2.

In some embodiments, in order to complete the model training, it is required to allocate real labels to the event records output by the model, and the present disclosure therefore provides a matching method. During model training, for an event type, event records are generated typewise, a loss function of a respective type is computed, and the loss function values of all the event types are summed as the final loss.

In some embodiments, during event role matching 658, the given event argument extraction score is $\hat{Y}^r = [P_1^r, P_2^r, \ldots, P_{N_i}^r]$, and the real argument is $Y^r = [Y_1^r, Y_2^r, \ldots, Y_{N_{gt}}^r]$, where $Y_i^r = (y_1^r, y_2^r, \ldots, y_{N_r}^r)$, and $y_j^r$ is an argument index corresponding to the $j^{th}$ role in the $i^{th}$ event record. In some embodiments, a cost function may be defined to compute pairwise losses of the event record $\hat{Y}_i^r = P_i^r \in \mathbb{R}^{N_r \times (N_a+1)}$ output by each event extraction model and the real event record $\hat{Y}_j^r \in \mathbb{R}^{N_r}$:

$$C_{role}(\hat{Y}_i^r, Y_j^r) = -\sum_{k=1}^{N_r} Y_{j,k}^r \log P_{i,k}^r \quad (12)$$

In some embodiments, the greedy algorithm may be employed to use the real event record most similar to each model output record $\hat{Y}_i^r$ as its label:

$$j^* = \operatorname*{argmin}_j C_{role}(\hat{Y}_i^r, Y_j^r) \quad (13)$$

where argmin is an operation of the j when $C_{role}(\hat{Y}_i^r, Y_j^r)$ has a minimum value.

In some embodiments, in order to excite the event extraction model to generate event records that have not been generated in history, real event records can be allocated to the model output without replacement, and after allocated to the model output, all the real event records are replaced, and allocated to the most similar mode output with replacement.

In this way, a final match result can be obtained, where the match result is a surjective mapping (surjective function){$\tau$(i)=j, i∈$\hat{I}^z$, j∈$I^z$}, indicating mapping the event record output by the $i^{th}$ model to the $j^{th}$ real event record. The mapping meets the surjective property of $\forall_j \in I^z$, $\exists i \in \hat{I}^z$, s.t.$\tau(i)=j$. At last, the following match loss function of the event role can be obtained:

$$\mathcal{L}_{role} = -\sum_{i=1}^{N_i} \sum_{k=1}^{N_r} Y_{\tau(i),k}^r \log P_{i,k}^r \quad (14)$$

In some embodiments, in event record matching 660, the filter score of event records output by a given model is $\hat{Y}^z = (p_1^z, p_2^z, \ldots, p_{N_i}^z) \in \mathbb{R}^{N_i}$, where it should be noted that the label of the corresponding real event record is $Y^z = (y_1^z, y_2^z, \ldots, y_{N_{gt}}^z) = \mathbb{1}^{N_{gt}}$. The event record $\hat{Y}_i^z = p_i^z$ output by the $i^{th}$ mode and the $j^{th}$ real event record label $Y_j^z = y_j^z = 1$ can be computed pairwise as follows:

$$C_{event}(\hat{Y}_i^z, Y_j^z) = -y_j^z \log p_i^z = -\log p_i^z \quad (15)$$

where $C_{event}(\hat{Y}_i^z, Y_j^z)$ is an event loss.

In order to filter out the optimal result from the event records output by the model as the final result, a role loss and an event loss can be defined as follows:

$$C_{all}(\hat{Y}_i, Y_j) = C_{event}(\hat{y}_i^z, y_j^z) + C_{role}(\hat{Y}_i^r, Y_j^r) \quad (16)$$

where $C_{role}$ is a role loss, and $C_{all}$ is a total loss.

In order to find an optimal match between the event record output by the model and the real event record, an injective mapping for mapping the $j^{th}$ real event record to the $i^{th}$ model output record may be defined as (injective function){$\pi(j)=i$, j∈$I^z$, i∈$\hat{I}^z$}, meeting the injective property of {$\pi(j_1) \neq \pi(j_2)$, $j_1 \neq j_2$, $\forall j_1, j_2 \in I^z$}. $\Pi(I^z, \hat{I}^z)$ is defined as an injective set from a set $I^z$ to a set $\hat{I}^z$. In some embodiments, the Hungarian algorithm may be used to obtain the minimum loss match:

$$\pi^* = \arg\min_{\pi \in \Pi(\hat{I}^z, I^z)} \sum_{j=1}^{N_{gt}} C_{all}(\hat{Y}_{\pi(j)}, Y_j). \quad (17)$$

Then, a binary cross-entropy loss can be computed as a loss function for event matching:

$$\mathcal{L}_{event} = -\left(\sum_{i \in A} \log p_i^z + \sum_{i \in B} \log(1 - p_i^z)\right) \quad (18)$$

where $A=\pi^*(I^z)$, $B=\hat{I}^z-\pi^*(I^z)$. Finally, the loss function of event record generation is:

$$\mathcal{L}_{ERG} = \gamma_1 \mathcal{L}_{role} + \gamma_2 \mathcal{L}_{event} \quad (19)$$

where $\gamma_1, \gamma_2 \in (0, 1)$ is hyperparameters of the model.

Figure 8:
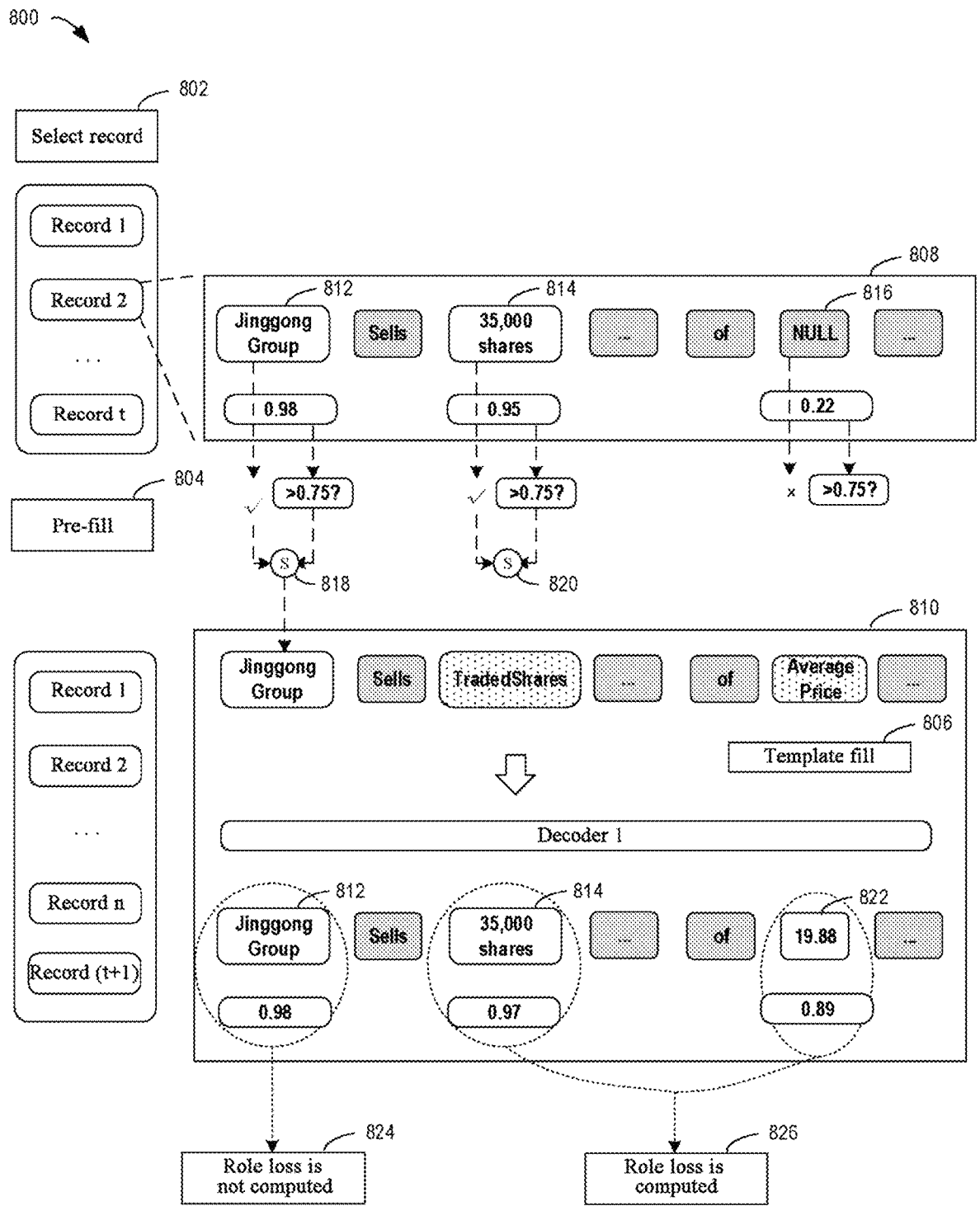
FIG. 8 is a schematic diagram of a pre-filling process according to some embodiments of the present disclosure.

FIG. 8 is a schematic diagram of a pre-filling process 800 according to some embodiments of the present disclosure. The main idea of the process 800 is that, for a given document D, the objective of the event extraction model is fitting the joint distribution $P(y_1, y_2, \ldots, y_n|D)$ of all event roles $\{y_i\}_{i=1}^n$. However, the parallel generation method may cause an under-fitting problem by directly fitting a complicated high-dimensional distribution. In order to mitigate the under-fitting problem, the present disclosure further provides a pre-filling strategy, to convert fitting of the joint distribution $P(\{y_i\}_{i=1}^n|D)$ into fitting of a conditional distribution $P(\{y_i, i \in I_{pf}\}|D) \times P(\{y_i, i \notin I_{pf}\}|D, \{y_i, i \in I_{pf}\})$.

As shown in FIG. 8, in some embodiments, in the $(t+1)^{th}$ round of iteration, event records filtered out by the filter are inspected, and an event record is then selected based on scores $p^z=(p_1^z, p_2^z, \ldots, p_t^z)$ of the event records using classification sampling:

$$p_i^{pf} = \frac{\mathbb{1}(p_i^z > \alpha)(1 - p_i^z)}{\sum_{i=1}^t \mathbb{1}(p_i^z > \alpha)(1 - p_i^z)} \quad (20)$$

where $\alpha$ is a threshold for binary classification, t is a round number of iteration, and $p_i^{pf}$ is a probability of sampling the event record.

In some embodiments, after a historical event record is selected, an argument with a score $P^r$ greater than $\beta$ is selected from the arguments correctly predicted, and Bernoulli sampling is performed with the probability of $\kappa$. Then, before starting the present round, sampled arguments are filled in the corresponding roles in the template in advance, and therefore, it is only required to fill in the remaining roles during generation. When computing the loss function, only the filled role losses, without the prefilled role losses, are computed.

By way of example, at 802, an event argument 812, an event argument 814 and an event argument 816 are filled in the template. Wherein, the threshold score $\beta$ can be set to 0.75. The event argument 812 has a score of 0.98, and therefore does not need to be pre-filled. The event argument 814 has a score of 0.95, and is thus sampled as requiring to be pre-filled 804. The event argument 816 has a score of 0.22, and is thus directly determined as requiring to be prefilled. The event argument 814 and the event argument 816 are masked, and corresponding locations in the masked template should be refilled. Through the template filling 806, the event argument 814 is not changed, and the event argument 816 is changed to an event argument 822 which has a score of 0.89. The event argument 814 is not pre-filled, and the role loss 824 is thus not computed. For the event arguments 814 and 822, role losses 826 should be computed.

Since real labels are required in the pre-filling strategy to sample event arguments correctly predicted, the event extraction model uses the pre-filling strategy in the training phase, and may not use the pre-filling strategy in the inference phase. With the pre-filling strategy, the present disclosure can remarkably mitigate the under-fitting problem of the parallel event extraction method while improving the event extraction accuracy.

Figure 9:
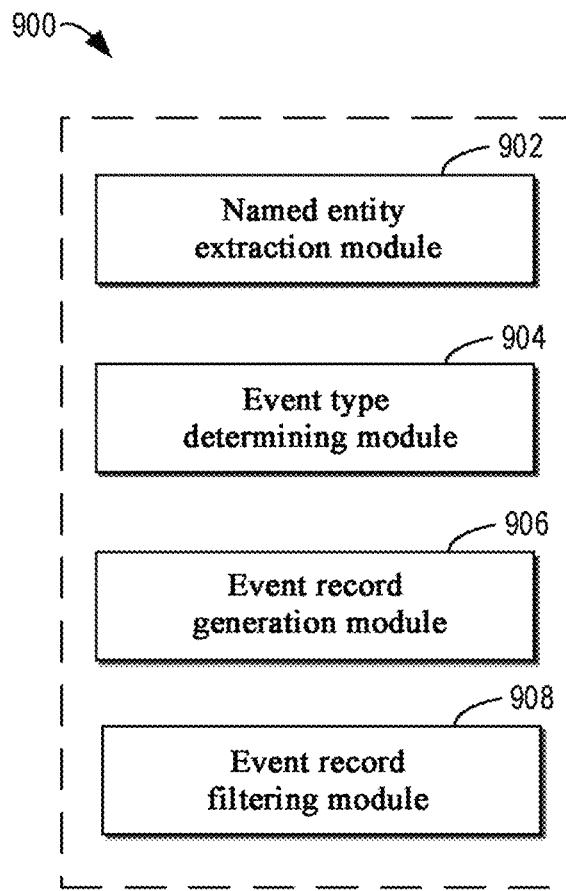
FIG. 9 is a block diagram of an apparatus for event extraction according to some embodiments of the present disclosure.

FIG. 9 is a block diagram of an apparatus 900 for event extraction according to some embodiments of the present disclosure. As shown therein, the apparatus 900 includes a named entity extraction module 902 configured to extract a plurality of named entities from a document as a plurality of event arguments, where the document includes at least two sentences. The apparatus 900 further includes an event type determining module 904 configured to further include an event type and a template corresponding to the event type in the document. The apparatus 900 also include an event record generation module 906 configured to fill the plurality of event arguments in corresponding locations in the template to generate a plurality of candidate event records, where, during generation of the plurality of candidate event records, each candidate event record starting from the second candidate event record in the plurality of candidate event records is generated iteratively. The apparatus 900 further includes an event record filtering module 908 configured to filter the plurality of candidate event records to obtain one or more target event records. The apparatus 900 may also include other modules to implement steps of the method 400 according to the embodiments of the present disclosure, details of which are omitted here for brevity.

It would be appreciated that the apparatus 900 of the present disclosure can attain at least one of the advantages of the method or process as described above. For example, the apparatus can implement event extraction at a document level, and can improve event extraction accuracy while omitting manual selection of an event role generation sequence. For another example, without predetermining an event role generation sequence, the apparatus can reduce significant fluctuations in event extraction accuracy, and mitigate the under-fitting problem of the event extraction model.

Figure 10:
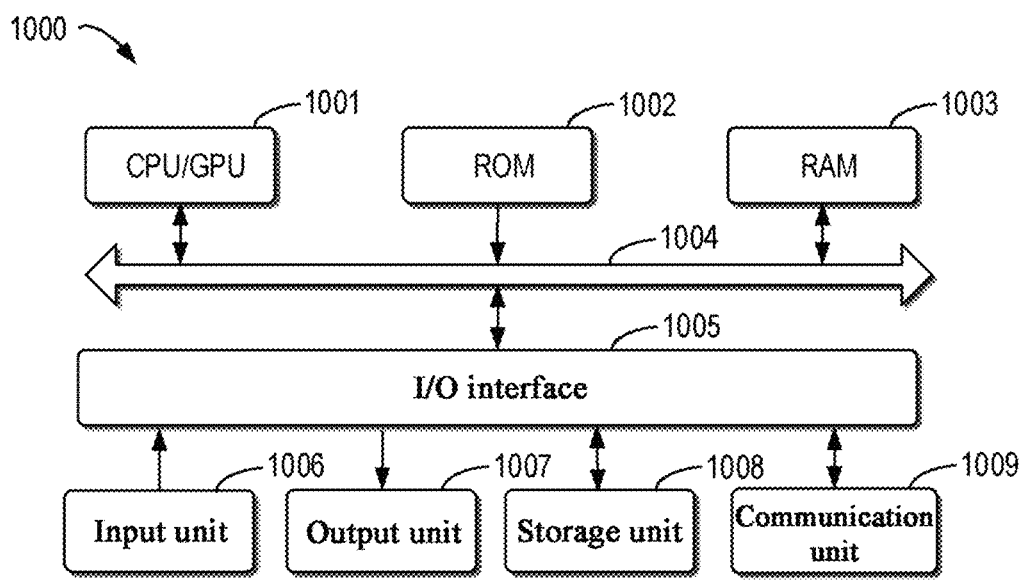
FIG. 10 is a block diagram of an electronic device according to some embodiments of the present disclosure.

FIG. 10 is a block diagram of an electronic device 1000 according to some embodiments of the present disclosure. The device 1000 may be a device or apparatus as described here. As shown therein, the device 1000 includes a central processing unit (CPU) and/or a graphics processing unit (GPU) 1001, which can perform various appropriate acts and processing, based on computer program instructions stored in a read-only memory (ROM) 1002 or computer program instructions loaded from a storage unit 1008 to a random access memory (RAM) 1003. The RAM 1003 stores therein various programs and data required for operations of the device 1000. The CPU/GPU 1001, the ROM 1002 and the RAM 1003 are connected via a bus 1004 with one another. Although not shown in FIG. 10, the apparatus 1000 may also include a coprocessor.

The following components in the device 1000 are connected to the I/O interface 1005: an input unit 1006 such as a keyboard, a mouse and the like; an output unit 1007 including various kinds of displays and a loudspeaker, etc.; a storage unit 1008 including a magnetic disk, an optical disk, and etc.; a communication unit 1009 including a network card, a modem, and a wireless communication transceiver, etc. The communication unit 1009 allows the device 1000 to exchange information/data with other devices through a computer network such as the Internet and/or various kinds of telecommunications networks.

Various methods and processes described above may be executed by the CPU/GPU 1001. For example, in some embodiments, the method can be implemented as a computer software program that is tangibly included in a machine readable medium, e.g., the storage unit 1008. In some embodiments, part or all of the computer programs may be loaded and/or mounted onto the device 1000 via the ROM 1002 and/or communication unit 1009. When the computer program is loaded to the RAM 1003 and executed by the CPU/GPU 1001, one or more steps of the method or process as described above may be executed.

In some embodiments, the method and process as described above may be implemented as a computer program product. The computer program product may include a computer readable storage medium having computer readable program instructions thereon for implementing various aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored thereon includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Hereinafter, some example implementations of the present disclosure will be listed.

Example 1. A method for event extraction, comprising:
extracting a plurality of named entities from a document as a plurality of event arguments, wherein the document comprises at least two sentences;
determining an event type and a template corresponding to the event type in the document;
filling the plurality of event arguments in respective locations in the template to generate a plurality of candidate event records, wherein, during generation of the plurality of candidate event records, each candidate event record starting from a second candidate event record in the plurality of candidate events is generated based on a candidate event record generated previously; and
filtering the plurality of candidate event records to obtain one or more target event record.

Example 2. The method of Example 1, wherein extracting the plurality of named entities from the document as the plurality of event arguments comprises:
encoding a plurality of words in the document;
determining a plurality of sentence representations associated with the plurality of words encoded; and
decoding the plurality of sentence representations to acquire the plurality of named entities.

Example 3. The method of any one of Examples 1-2, wherein determining the event type and the template corresponding to the event type in the document comprises:
determining a plurality of entity vectors of the plurality of named entities;
compressing the plurality of entity vectors to generate a candidate argument representation set;
determining a plurality of sentence vectors of the document;
compressing the plurality of sentence vectors to generate a sentence representation set; and
determining the event type based on the candidate argument representation set and the sentence representation set.

Example 4. The method of any one of Examples 1-3, wherein filling the plurality of event arguments in the respective locations in the template to generate the plurality of candidate event records comprises:
determining a word representation set representing template words of the template; and
decoding the candidate argument representation set and the word representation set to determine the candidate event records.

Example 5. The method of any one of Examples 1-4, wherein decoding the candidate argument representation set and the word representation set to determine the candidate event records comprises:
generating a template representation associated with the event arguments based on the candidate argument representation set and the word representation set;
determining a plurality of probabilities representing a plurality of event arguments corresponding to a plurality of event roles;
filtering the plurality of event arguments based on the plurality of probabilities to determine event arguments corresponding to the plurality of event roles; and
determining the event arguments and the event roles as the candidate event records.

Example 6. The method of any one of Examples 1-5, further comprising:
compressing a first event argument in a first event record in the plurality of candidate event records and the template representation to generate a representation of the first event record; and
generating a second event record based on the representation of the first event record, the sentence representations in the document, and representations of the plurality of event arguments.

Example 7. The method of any one of Examples 1-6, wherein filtering the plurality of candidate event records to obtain the one or more target event record comprises:
determining a candidate representation set of the plurality of candidate event records;
filtering the plurality of sentence representations based on the candidate representation set to determine a plurality of extraction scores of the plurality of sentence representations; and
determining the one or more target event records based on the plurality of extraction scores.

Example 8. The method of any one of Examples 1-7, wherein the method is performed in a trained machine learning model, and determining the one or more target event records based on the plurality of extraction scores in a training phase comprises:
determining role losses associated with a real event argument set, as a label, and the arguments and a plurality of event roles corresponding thereto;
determining the plurality of candidate event records and real event arguments corresponding thereto, based on a role loss function associated with the role losses; and
matching each event record in the plurality of candidate event records with a respective real event record.

Example 9. The method of any one of Examples 1-8, wherein matching each event record in the plurality of candidate event records with the respective real event record comprises:
determining a plurality of filter scores of the plurality of candidate event records;
determining event losses associated with a plurality of real event records, as labels, and the plurality of filter scores;
determining a total loss based on the event losses and the role losses;
determining an event record loss function associated with the total loss; and
matching, based on the event record loss function, a real event record with a respective event record in the plurality of candidate event records.

Example 10. The method of any one of Examples 1-9, wherein training the machine learning model comprises:
selecting a first event record from a plurality of event records;
filling, based on a score, an event argument in an event role in the first event record; and training the machine learning model based on unfilled event roles in the first event record.

Example 11. The method of any one of Examples 1-10, wherein filling, based on the score, the event argument in the event role comprises:

in response to the score exceeding a threshold, filling the event argument with the score exceeding the threshold in the respective event role;

determining the unfilled remaining event roles in the first event record; and filling the plurality of event arguments in the remaining event roles.

Example 12. The method of any one of Examples 1-11, further comprising:

computing role losses of the remaining event roles; and training the machine learning model based on the role losses of the remaining event roles.

Example 13. An apparatus for event extraction, comprising:

a named entity extraction module configured to extract a plurality of named entities from a document as a plurality of event arguments, wherein the document comprises at least two sentences;

an event type determining module configured to determine an event type and a template corresponding to the event type in the document;

an event record generation module configured to fill the plurality of event arguments in respective locations in the template to generate a plurality of candidate event records, wherein, during generation of the plurality of candidate event records, each candidate event record starting from a second candidate event record in the plurality of candidate events is generated based on a candidate event record generated previously; and an event record filtering module configured to filter the plurality of candidate event records to obtain one or more target event record.

Example 14. The apparatus of Example 13, wherein the named entity extraction module comprises:

a first encoding module configured to encode a plurality of words in the document;

a first sentence representation determining module configured to determine a plurality of sentence representations associated with the plurality of words encoded; and a named entity acquisition module configured to decode the plurality of sentence representations to acquire the plurality of named entities.

Example 15. The apparatus of any one of Examples 13-14, wherein the event type determining module comprises:

an entity vector determining module configured to determine a plurality of entity vectors of the plurality of named entities;

a candidate argument representation set generation module configured to compress the plurality of entity vectors to generate a candidate argument representation set;

a sentence vector determining module configured to determine a plurality of sentence vectors of the document;

a sentence representation set generation module configured to compress the plurality of sentence vectors to generate a sentence representation set; and a second event type determining module configured to determine the event type based on the candidate argument representation set and the sentence representation set.

Example 16. The apparatus of any one of Examples 13-15, wherein the event record generation module comprises:

a word representation set determining module configured to determine a word representation set representing template words of the template; and a candidate event record generation module configured to decode the candidate argument representation set and the word representation set to determine the candidate event records.

Example 17. The apparatus of any one of Examples 13-16, wherein the candidate event record generation module comprises:

a module representation generation module configured to generate a template representation associated with the event arguments based on the candidate argument representation set and the word representation set;

a probability determining module configured to determine a plurality of probabilities representing a plurality of event arguments corresponding to a plurality of event roles;

a second event record filtering module configured to filter the plurality of event arguments based on the plurality of probabilities to determine event arguments corresponding to the plurality of event roles; and a second candidate event record determining module configured to determine the event arguments and the event roles as the candidate event records.

Example 18. The apparatus of any one of Examples 13-17, further comprising:

a template representation compressing module configured to compress a first event argument in a first event record in the plurality of candidate event records and the template representation to generate a representation of the first event record; and a second event record generation module configured to generate a second event record based on the representation of the first event record, the sentence representations in the document, and representations of the plurality of event arguments.

Example 19. The apparatus of any one of Examples 13-18, wherein the event record filtering module comprises:

a candidate representation set determining module configured to determine a candidate representation set of the plurality of candidate event records;

an extraction score determining module configured to filter the plurality of sentence representations based on the candidate representation set to determine a plurality of extraction scores of the plurality of sentence representations; and a target event record determining module configured to determine the one or more target event records based on the plurality of extraction scores.

Example 20. The apparatus of any one of Examples 13-19, wherein the apparatus is a trained machine learning model, and the target event record determining module in a training phase comprises:

a first training module configured to determine role losses associated with a real event argument set, as a label, and the plurality of extraction scores, wherein the real event argument set indicates a plurality of real event arguments and a plurality of event roles corresponding thereto;

a second training module configured to determine the plurality of candidate event records and real event arguments corresponding thereto, based on a role loss function associated with the role losses; and a third training module configured to match each event record in the plurality of candidate event records with a respective real event record.

Example 21. The apparatus of any one of Examples 13-20, wherein the third training module comprises:

a filter score determining module configured to determine a plurality of filter scores of the plurality of candidate event records;

an event loss determining module configured to determine event losses associated with a plurality of real event records, as labels, and the plurality of filter scores;

a total loss determining module configured to determine a total loss based on the event losses and the role losses;

an event record loss function determining module configured to determine an event record loss function associated with the total loss; and a first matching module configured to match, based on the event record loss function, a real event record with a respective event record in the plurality of candidate event records.

Example 22. The apparatus of any one of Examples 13-21, further comprising:

an event record selection module configured to select a first event record from a plurality of event records;

an event role filling module configured to fill, based on a score, an event argument in an event role in the first event record; and a fourth training module configured to train the machine learning model based on unfilled event roles in the first event record.

Example 23. The apparatus of any one of Examples 13-22, wherein the event role filling module comprises:

a second event role filling module configured to, in response to the score exceeding a threshold, fill the event argument with the score exceeding the threshold in the respective event role;

a third event role filling module configured to determine the unfilled remaining event roles in the first event record; and a fourth event role filling module configured to fill the plurality of event arguments in the remaining event roles.

Example 24. The apparatus of any one of Examples 13-23, further comprising:

a role loss computing module configured to compute role losses of the remaining event roles; and a fifth training module configured to train the machine learning model based on the role losses of the remaining event roles.

Example 25. An electronic device, comprising:

a processor; and a memory coupled to the processor and having instructions stored therein, wherein the instructions, when executed by the processor, cause the electronic device to perform acts of:

extracting a plurality of named entities from a document as a plurality of event arguments, wherein the document comprises at least two sentences;

determining an event type and a template corresponding to the event type in the document;

filling the plurality of event arguments in respective locations in the template to generate a plurality of candidate event records, wherein, during generation of the plurality of candidate event records, each candidate event record starting from a second candidate event record in the plurality of candidate events is generated based on a candidate event record generated previously; and filtering the plurality of candidate event records to obtain one or more target event record.

Example 26. The electronic device of Example 25, wherein extracting the plurality of named entities from the document as the plurality of event arguments comprises:

encoding a plurality of words in the document;

determining a plurality of sentence representations associated with the plurality of words encoded; and decoding the plurality of sentence representations to acquire the plurality of named entities.

Example 27. The electronic device of any one of Examples 25-26, wherein determining the event type and the template corresponding to the event type in the document comprises:

determining a plurality of entity vectors of the plurality of named entities;

compressing the plurality of entity vectors to generate a candidate argument representation set;

determining a plurality of sentence vectors of the document;

compressing the plurality of sentence vectors to generate a sentence representation set; and determining the event type based on the candidate argument representation set and the sentence representation set.

Example 28. The electronic device of any one of Examples 25-27, wherein filling the plurality of event arguments in the respective locations in the template to generate the plurality of candidate event records comprises:

determining a word representation set representing template words of the template; and decoding the candidate argument representation set and the word representation set to determine the candidate event records.

Example 29. The electronic device of any one of Examples 25-28, wherein decoding the candidate argument representation set and the word representation set to determine the candidate event records comprises:

generating a template representation associated with the event arguments based on the candidate argument representation set and the word representation set;

determining a plurality of probabilities representing a plurality of event arguments corresponding to a plurality of event roles;

filtering the plurality of event arguments based on the plurality of probabilities to determine event arguments corresponding to the plurality of event roles; and determining the event arguments and the event roles as the candidate event records.

Example 30. The electronic device of any one of Examples 25-29, further comprising:

compressing a first event argument in a first event record in the plurality of candidate event records and the template representation to generate a representation of the first event record; and generating a second event record based on the representation of the first event record, the sentence representations in the document, and representations of the plurality of event arguments.

Example 31. The electronic device of any one of Examples 25-30, wherein filtering the plurality of candidate event records to obtain the one or more target event record comprises:
determining a candidate representation set of the plurality of candidate event records;
filtering the plurality of sentence representations based on the candidate representation set to determine a plurality of extraction scores of the plurality of sentence representations; and
determining the one or more target event records based on the plurality of extraction scores.

Example 32. The electronic device of any one of Examples 25-31, wherein the acts are performed in a trained machine learning model, and determining the one or more target event records based on the plurality of extraction scores in a training phase comprises:
determining role losses associated with a real event argument set, as a label, and the arguments and a plurality of event roles corresponding thereto;
determining the plurality of candidate event records and real event arguments corresponding thereto, based on a role loss function associated with the role losses; and
matching each event record in the plurality of candidate event records with a respective real event record.

Example 33. The electronic device of any one of Examples 25-32, wherein matching each event record in the plurality of candidate event records with the respective real event record comprises:
determining a plurality of filter scores of the plurality of candidate event records;
determining event losses associated with a plurality of real event records, as labels, and the plurality of filter scores;
determining a total loss based on the event losses and the role losses;
determining an event record loss function associated with the total loss; and
matching, based on the event record loss function, a real event record with a respective event record in the plurality of candidate event records.

Example 34. The electronic device of any one of Examples 25-33, wherein training the machine learning model comprises:
selecting a first event record from a plurality of event records;
filling, based on a score, an event argument in an event role in the first event record; and
training the machine learning model based on unfilled event roles in the first event record.

Example 35. The electronic device of any one of Examples 25-34, wherein filling, based on the score, the event argument in the event role comprises:
in response to the score exceeding a threshold, filling the event argument with the score exceeding the threshold in the respective event role;
determining the unfilled remaining event roles in the first event record; and
filling the plurality of event arguments in the remaining event roles.

Example 36. The electronic device of any one of Examples 25-26, wherein the acts further comprise:
computing role losses of the remaining event roles; and
training the machine learning model based on the role losses of the remaining event roles.

Example 37. A computer readable storage medium having computer executable instructions stored thereon, wherein the computer executable instructions, when executed by a processor, implement the method of any one of Examples 1-12.

Example 38. A computer program product tangibly stored on a computer readable medium and comprising computer executable instructions, wherein the computer executable instructions, when executed by a processor, implement the method of any one of Examples 1-12.

Although the present disclosure has been described in language specific to structural features and/or methodological acts, it is to be understood that the present disclosure specified in the appended claims is not necessarily limited to the specific features or acts described above. Rather, the specific features and acts described above are disclosed as example forms of implementing the claims.

The invention claimed is:

1. A method for event extraction, comprising:
extracting a plurality of named entities from a document as a plurality of event arguments, wherein the document comprises at least two sentences;
determining an event type and a template corresponding to the event type in the document;
filling the plurality of event arguments in respective locations in the template to generate a plurality of candidate event records, wherein, during generation of the plurality of candidate event records, each candidate event record starting from a second candidate event record in the plurality of candidate events is iteratively generated based on a candidate event record generated previously by: for a t-th iteration, where t is an integer greater than or equal to 2, selecting a candidate event record based on a plurality of scores of the plurality of candidate event records; selecting an event argument based on a plurality of scores of the plurality of event arguments; filling the selected event argument into a corresponding event role in the template corresponding to the selected candidate event record; and for a (t+1)-th iteration, updating the plurality of scores of the plurality of candidate event records excluding a filling result of the t-th iteration; and
filtering the plurality of candidate event records to obtain one or more target event record.

2. The method of claim 1, wherein extracting the plurality of named entities from the document as the plurality of event arguments comprises:
encoding a plurality of words in the document;
determining a plurality of sentence representations associated with the plurality of words encoded; and
decoding the plurality of sentence representations to acquire the plurality of named entities.

3. The method of claim 1, wherein determining the event type and the template corresponding to the event type in the document comprises:
determining a plurality of entity vectors of the plurality of named entities;
compressing the plurality of entity vectors to generate a candidate argument representation set;
determining a plurality of sentence vectors of the document;
compressing the plurality of sentence vectors to generate a sentence representation set; and
determining the event type based on the candidate argument representation set and the sentence representation set.

4. The method of claim 3, wherein filling the plurality of event arguments in the respective locations in the template to generate the plurality of candidate event records comprises:
   determining a word representation set representing template words of the template; and
   decoding the candidate argument representation set and the word representation set to determine the candidate event records.

5. The method of claim 4, wherein decoding the candidate argument representation set and the word representation set to determine the candidate event records comprises:
   generating a template representation associated with the event arguments based on the candidate argument representation set and the word representation set;
   determining a plurality of probabilities representing a plurality of event arguments corresponding to a plurality of event roles;
   filtering the plurality of event arguments based on the plurality of probabilities to determine event arguments corresponding to the plurality of event roles; and
   determining the event arguments and the event roles as the candidate event records.

6. The method of claim 5, further comprising:
   compressing a first event argument in a first event record in the plurality of candidate event records and the template representation to generate a representation of the first event record; and
   generating a second event record based on the representation of the first event record, the sentence representations in the document, and representations of the plurality of event arguments.

7. The method of claim 2, wherein filtering the plurality of candidate event records to obtain the one or more target event record comprises:
   determining a candidate representation set of the plurality of candidate event records;
   filtering the plurality of sentence representations based on the candidate representation set to determine a plurality of extraction scores of the plurality of sentence representations; and
   determining the one or more target event records based on the plurality of extraction scores.

8. The method of claim 7, wherein the method is performed in a trained machine learning model, and determining the one or more target event records based on the plurality of extraction scores in a training phase comprises:
   determining role losses associated with a real event argument set, as a label, and the plurality of extraction scores, wherein the real event argument set indicates a plurality of real event arguments and a plurality of event roles corresponding thereto;
   determining the plurality of candidate event records and real event arguments corresponding thereto, based on a role loss function associated with the role losses; and
   matching each event record in the plurality of candidate event records with a respective real event record.

9. The method of claim 8, wherein matching each event record in the plurality of candidate event records with the respective real event record comprises:
   determining a plurality of filter scores of the plurality of candidate event records;
   determining event losses associated with a plurality of real event records, as labels, and the plurality of filter scores;
   determining a total loss based on the event losses and the role losses;
   determining an event record loss function associated with the total loss; and
   matching, based on the event record loss function, a real event record with a respective event record in the plurality of candidate event records.

10. The method of claim 9, wherein training the machine learning model comprises:
    selecting a first event record from a plurality of event records;
    filling, based on a score, an event argument in an event role in the first event record; and
    training the machine learning model based on unfilled event roles in the first event record.

11. The method of claim 10, wherein filling, based on the score, the event argument in the event role comprises:
    in response to the score exceeding a threshold, filling the event argument with the score exceeding the threshold in the respective event role;
    determining the unfilled remaining event roles in the first event record; and
    filling the plurality of event arguments in the remaining event roles.

12. The method of claim 11, further comprising:
    computing role losses of the remaining event roles; and
    training the machine learning model based on the role losses of the remaining event roles.

13. An electronic device, comprising:
    a processor; and
    a memory coupled to the processor and having instructions stored therein, wherein the instructions, when executed by the processor, cause the electronic device to perform actions comprising:
       extract a plurality of named entities from a document as a plurality of event arguments, wherein the document comprises at least two sentences;
       determine an event type and a template corresponding to the event type in the document;
       fill the plurality of event arguments in respective locations in the template to generate a plurality of candidate event records, wherein, during generation of the plurality of candidate event records, each candidate event record starting from a second candidate event record in the plurality of candidate events is iteratively generated based on a candidate event record generated previously by: for a t-th iteration, where t is an integer greater than or equal to 2, selecting a candidate event record based on a plurality of scores of the plurality of candidate event records; selecting an event argument based on a plurality of scores of the plurality of event arguments; filling the selected event argument into a corresponding event role in the template corresponding to the selected candidate event record; and for a (t+1)-th iteration, updating the plurality of scores of the plurality of candidate event records excluding a filling result of the t-th iteration; and
       filter the plurality of candidate event records to obtain one or more target event record.

14. The device of claim 13, wherein extracting the plurality of named entities from the document as the plurality of event arguments comprises:
    encoding a plurality of words in the document;
    determining a plurality of sentence representations associated with the plurality of words encoded; and
    decoding the plurality of sentence representations to acquire the plurality of named entities.

15. The device of claim 13, wherein determining the event type and the template corresponding to the event type in the document comprises:
   determining a plurality of entity vectors of the plurality of named entities;
   compressing the plurality of entity vectors to generate a candidate argument representation set;
   determining a plurality of sentence vectors of the document;
   compressing the plurality of sentence vectors to generate a sentence representation set; and
   determining the event type based on the candidate argument representation set and the sentence representation set.

16. The device of claim 15, wherein filling the plurality of event arguments in the respective locations in the template to generate the plurality of candidate event records comprises:
   determining a word representation set representing template words of the template; and
   decoding the candidate argument representation set and the word representation set to determine the candidate event records.

17. The device of claim 16, wherein decoding the candidate argument representation set and the word representation set to determine the candidate event records comprises:
   generating a template representation associated with the event arguments based on the candidate argument representation set and the word representation set;
   determining a plurality of probabilities representing a plurality of event arguments corresponding to a plurality of event roles;
   filtering the plurality of event arguments based on the plurality of probabilities to determine event arguments corresponding to the plurality of event roles; and
   determining the event arguments and the event roles as the candidate event records.

18. The device of claim 17, wherein the actions further comprising:
   compressing a first event argument in a first event record in the plurality of candidate event records and the template representation to generate a representation of the first event record; and
   generating a second event record based on the representation of the first event record, the sentence representations in the document, and representations of the plurality of event arguments.

19. The device of claim 14, wherein filtering the plurality of candidate event records to obtain the one or more target event record comprises:
   determining a candidate representation set of the plurality of candidate event records;
   filtering the plurality of sentence representations based on the candidate representation set to determine a plurality of extraction scores of the plurality of sentence representations; and
   determining the one or more target event records based on the plurality of extraction scores.

20. A computer readable storage medium having computer executable instructions stored thereon, wherein the computer executable instructions, when executed by a processor, implement the method comprising:
   extract a plurality of named entities from a document as a plurality of event arguments, wherein the document comprises at least two sentences;
   determine an event type and a template corresponding to the event type in the document;
   fill the plurality of event arguments in respective locations in the template to generate a plurality of candidate event records, wherein, during generation of the plurality of candidate event records, each candidate event record starting from a second candidate event record in the plurality of candidate events is iteratively generated based on a candidate event record generated previously by: for a t-th iteration, where t is an integer greater than or equal to 2, selecting a candidate event record based on a plurality of scores of the plurality of candidate event records; selecting an event argument based on a plurality of scores of the plurality of event arguments; filling the selected event argument into a corresponding event role in the template corresponding to the selected candidate event record; and for a (t+1)-th iteration, updating the plurality of scores of the plurality of candidate event records excluding a filling result of the t-th iteration; and
   filter the plurality of candidate event records to obtain one or more target event record.

* * * * *